(12) United States Patent
Cho et al.

(10) Patent No.: US 10,071,739 B2
(45) Date of Patent: Sep. 11, 2018

(54) ENGINE TORQUE CONTROL METHOD FOR VEHICLE

(71) Applicant: Hyundai Motor Company, Seoul (KR)

(72) Inventors: Sung Hyun Cho, Gyeonggi-Do (KR); Hwan Hur, Seoul (KR); Jeong Ho Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 328 days.

(21) Appl. No.: 15/066,357

(22) Filed: Mar. 10, 2016

(65) Prior Publication Data
US 2017/0113692 A1 Apr. 27, 2017

(30) Foreign Application Priority Data

Oct. 27, 2015 (KR) ........................ 10-2015-0149258

(51) Int. Cl.
| | |
|---|---|
| *B60W 30/188* | (2012.01) |
| *B60W 10/02* | (2006.01) |
| *B60W 10/06* | (2006.01) |
| *F16H 61/688* | (2006.01) |
| *F16D 21/02* | (2006.01) |
| *F02D 41/02* | (2006.01) |
| *F02D 41/14* | (2006.01) |

(52) U.S. Cl.
CPC .......... *B60W 30/188* (2013.01); *B60W 10/02* (2013.01); *B60W 10/06* (2013.01); *F02D 41/022* (2013.01); *F16D 21/02* (2013.01); *F16H 61/688* (2013.01); *B60W 2510/0208* (2013.01); *B60W 2710/025* (2013.01); *B60W 2710/0666* (2013.01); *F02D 41/023* (2013.01); *F02D 2041/1432* (2013.01); *F02D 2200/101* (2013.01); *F02D 2200/1002* (2013.01); *F02D 2250/18* (2013.01)

(58) Field of Classification Search
CPC .... B60W 30/188; B60W 10/02; B60W 10/06; B60W 2510/0208; B60W 2510/0241; B60W 2710/025; B60W 2710/0666; F16H 61/688; F16D 21/02; F02D 41/022; F02D 2041/1432; F02D 2200/101; F02D 2250/18; F02D 2200/1002; F02D 41/023
See application file for complete search history.

(56) References Cited

U.S. PATENT DOCUMENTS

| | | | | |
|---|---|---|---|---|
| 2004/0102289 A1* | 5/2004 | Aikawa | ................. | F16H 61/061 477/176 |
| 2004/0185985 A1* | 9/2004 | Inoue | ...................... | F16D 48/06 477/70 |
| 2014/0121926 A1* | 5/2014 | Yoon | ................... | F16H 61/0437 701/68 |

FOREIGN PATENT DOCUMENTS

| | | |
|---|---|---|
| JP | 2005-518982 A | 6/2005 |
| JP | 2006-064154 A | 3/2006 |
| JP | 2013-221478 A | 10/2013 |
| KR | 10-2012-0000951 A | 1/2012 |

(Continued)

*Primary Examiner* — Jacob S. Scott
*Assistant Examiner* — Tinh Dang
(74) *Attorney, Agent, or Firm* — Mintz Levin Cohn Ferris Glovsky and Popeo, P.C.; Peter F. Corless

(57) ABSTRACT

An engine torque control method for a vehicle according to the present disclosure includes: sensing an engagement state of a clutch of the vehicle; calculating a slip index according to engine torque, engine revolutions per minute (RPM), clutch torque, and clutch RPM; and filter-controlling the engine torque based on the calculated slip index and the sensed engagement state of the clutch.

13 Claims, 9 Drawing Sheets

(56) References Cited

FOREIGN PATENT DOCUMENTS

| KR | 20120077737 | 7/2012 |
|---|---|---|
| KR | 10-2014-0055191 A | 5/2014 |

* cited by examiner

ENGINE TORQUE CONTROL METHOD FOR VEHICLE

CROSS REFERENCE TO RELATED APPLICATION

The present application claims priority to and the benefit of Korean Patent Application No. 10-2015-0149258, filed Oct. 27, 2015, the entire contents of which are incorporated herein for all purposes by reference.

BACKGROUND OF THE DISCLOSURE

Technical Field

The present disclosure relates generally to an engine torque control method for a vehicle, and more particularly, to an engine torque control method for a vehicle that quantifies slip of a clutch and accurately filter-controls engine torque.

Description of the Related Art

A Dual Clutch Transmission (DCT) is a system in which the flywheel of an engine and the dry clutch of a transmission are directly connected to each other. Accordingly, appropriate driving force can be transmitted to a driveshaft, that is, an output shaft, by applying clutch torque to torque from the engine. If the driving force is not smoothly transmitted, engine flare may be generated, and if a clutch is excessively engaged at too low of an engine speed, an engine stall may result.

FIG. 1 is a graph showing a conventional engine torque change in tip-out during shifting, and FIG. 2 is a graph showing a conventional engine torque change in tip-out after tip-in during creeping. As shown in FIGS. 1 and 2, in tip-out in which a driver lifts his or her foot off an acceleration pedal for deceleration, it can be seen that flare is generated, whereby the engine revolutions per minute (RPM) keeps increasing and then decreases after a predetermined time passes due to excessive torque which is generated by engine torque temporarily exceeding clutch torque.

Conventionally, a Transmission Control Unit (TCU) filter-controls engine torque on the basis of torque from an engine. However, in some cases, a clutch is rapidly disengaged to protect a vehicle regardless of the state of an engine when there is a possibility of engine stall.

In this situation, an Engine Control Unit (ECU) receives state information, such as opening/slipping/locking of a clutch, but cannot receive accurate information about the state of a transmission. Accordingly, when torque is generated by inappropriately operating an engine with a clutch open, engine flare is generated.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a control method that prevents an engine flare by calculating a slip index showing the degree of slip of a clutch and filter-controlling engine torque on the basis of the slip index and the engagement state of the clutch.

In order to achieve the above object, according to embodiments of the present disclosure, there is provided an engine torque control method for a vehicle including: sensing an engagement state of a clutch of the vehicle; calculating a slip index according to engine torque, engine revolutions per minute (RPM), clutch torque, and clutch RPM; and filter-controlling the engine torque based on the calculated slip index and the sensed engagement state of the clutch.

The sensing of an engagement state may include: a first checking process that checks whether the clutch is in an open state; a second checking process that checks whether the clutch is in a creeping, starting, shifting, or engaging state, when the clutch is determined as being in the open state; and a third checking process that checks whether the clutch is in a slip state, when the clutch is determined as being in any of the creeping, starting, shifting, or engaging state.

When the clutch is determined as being in the open state, the engagement state of the clutch may be sensed as being an open state.

When the clutch is not in the slip state, the engagement state of the clutch is sensed as being an open state.

When the clutch is not in any of the creeping, starting, shifting, or engaging state, the engagement state of the clutch may be sensed as being a locking state.

The slip index may be obtained by subtracting a value obtained by multiplying the clutch torque by the clutch RPM from a value obtained by multiplying the engine torque by the engine RPM, and then by dividing the difference by a value obtained by multiplying engine torque by engine RPM.

When the engagement state of the clutch is a locking state or an open state, the engine torque may be filter-controlled such that the slope of the engine torque may increase.

When the engagement state of the clutch is the open state, as a difference between the slip index and an expected slip index in the open state of the clutch increases, the slope of the engine torque may be controlled to decrease.

When the engagement state of the clutch is a locking state, as a difference between the slip index and an expected slip index in the locking state of the clutch increases, the slope of the engine torque may be controlled to decrease.

When the clutch is in the creeping state and a rotational speed of an input shaft is equal to or greater than a first speed, it may be determined that the clutch is not in the slip state.

When the clutch is in the starting state and an engine speed increases to a speed less than a second speed, it may be determined that the clutch is not in the slip state.

When the clutch is in the shifting state and a disengagement clutch is disengaged before torque of the disengagement clutch is increased to engage an engagement clutch, it may be determined that the clutch is not in the slip state.

When the clutch is in the engaging state and an engine speed is less than a speed of an input shaft, it may be determined that the clutch is not in the slip state.

According to the engine torque control method for a vehicle described above, filter-control of engine torque is performed based on clear information about engagement torque of a clutch, so an engine flare can be prevented.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
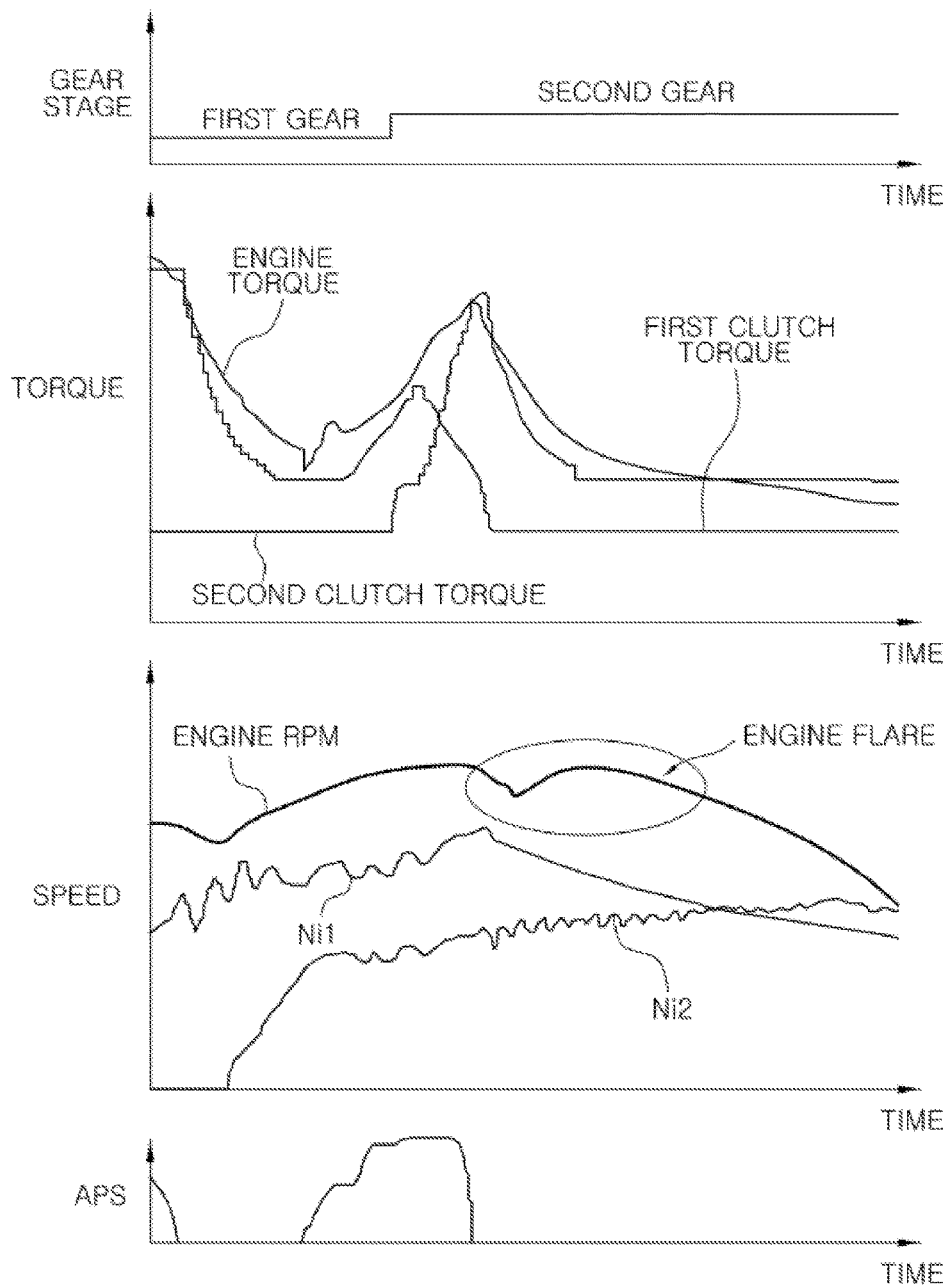
FIG. 1 is a graph showing a conventional engine torque change in tip-out during shifting.
Figure 2:
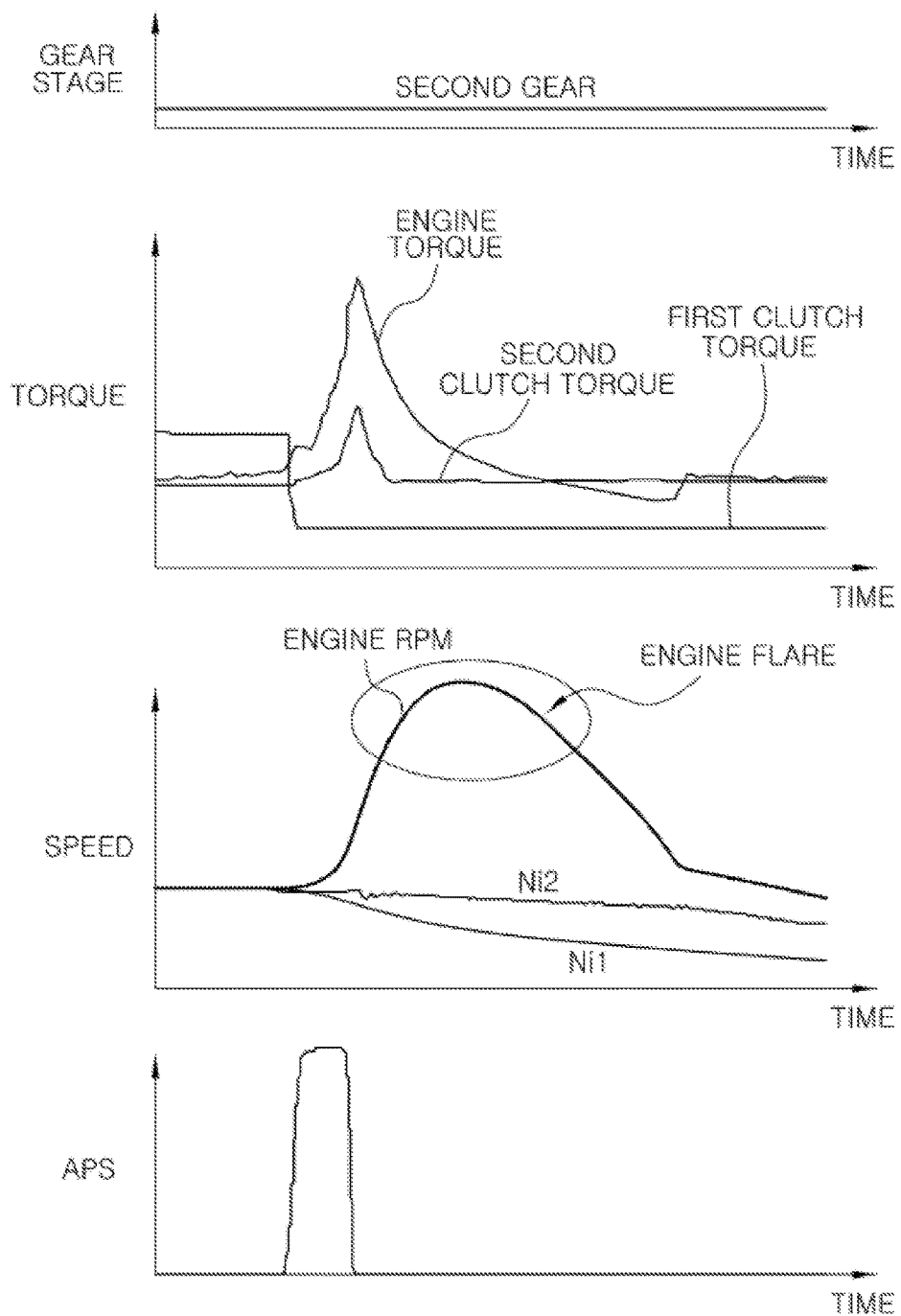
FIG. 2 is a graph showing a conventional engine torque change in tip-out after tip-in during creeping.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

An engine torque control method for a vehicle according to embodiments of the present disclosure is described hereafter with reference to the accompanying drawings.

Figure 3:
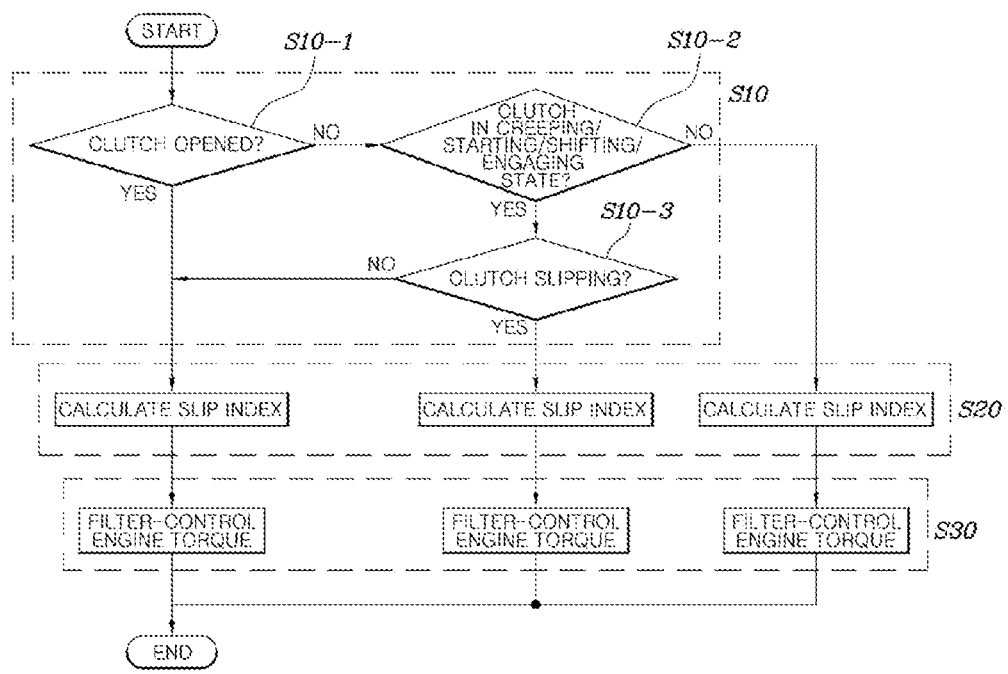
FIG. 3 is a flowchart showing an engine torque control method of a vehicle.
Figure 4:
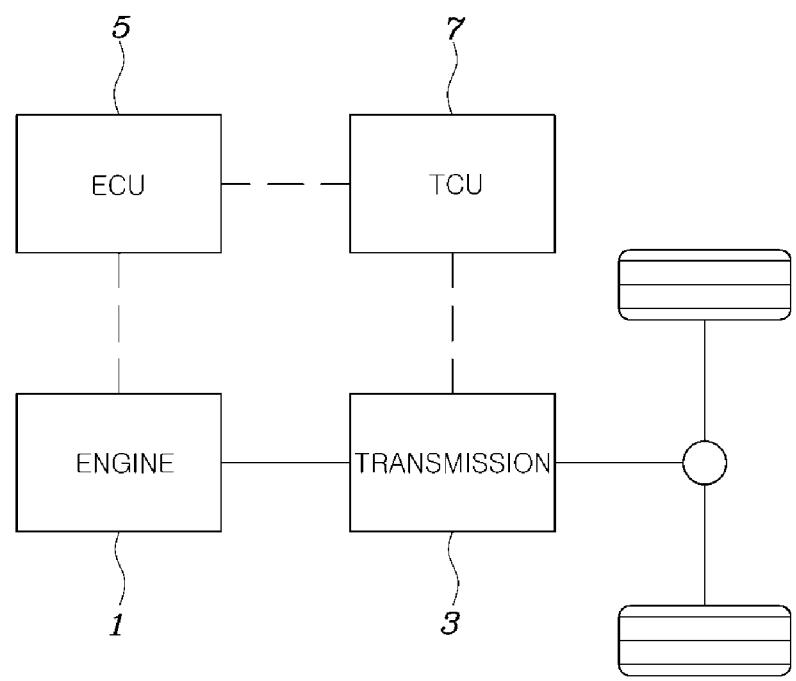
FIG. 4 is a block diagram showing an apparatus for controlling engine torque of a vehicle.

FIG. 3 is a flowchart showing an engine torque control method of a vehicle, and FIG. 4 is a block diagram showing an apparatus for controlling engine torque of a vehicle.

As shown in FIGS. 3 and 4, an engine torque control method for a vehicle includes: sensing an engagement state of a clutch (S10), calculating a slip index according to engine torque, engine revolutions per minute (RPM), clutch torque, and clutch RPM (S20), after the sensing of an engagement state (S10), and filter-controlling engine torque on the basis of the slip index and the engagement state of the clutch (S30), after the calculating of a slip index (S20).

The clutch is disposed in a transmission 3 and connected to an engine 1. A Transmission Control Unit (TCU) 7 senses the engagement state of the clutch in the transmission 3. The TCU 7 can calculate a slip index accurately showing the degree of slip of the clutch on the basis of engine torque transmitted from an Engine Control Unit (ECU) 5, the engine RPM, clutch torque sensed from the transmission 3, and the clutch RPM. Thereafter, the ECU 5 can appropriately prevent engine flare of an engine by filter-controlling engine torque in response to a signal about the slip index and the engagement state of the clutch from the TCU 7. The detailed method will be described below.

In particular, the sensing of an engagement state (S10) includes: a first checking process that checks whether the clutch is in an open state (S10-1); a second checking process that checks whether the clutch is in any of a creeping, starting, shifting, or engaging state (S10-2), when the clutch is determined as being open in the first checking process (S10-1); and a third checking process that checks whether the clutch is in a slip state (S10-3), when the clutch is determined as being in the creeping, starting, shifting, or engaging state in the second checking process (S10-2).

First, the TCU 7 checks whether the clutch is in an open state (S10-1). When the clutch is determined as being in the open state in the first checking process (S10-1), the engagement state of the clutch can be determined as being an open state.

In contrast, when the clutch is determined as not being in the open state in the first checking process (S10-1), the TCU 7 can check whether the clutch is in any of the creeping, starting, shifting, or engaging state to determine whether the clutch is in a slip state (S10-2). However, even if the clutch is in a creeping, starting, shifting, or engaging state, the clutch may be physically in an open state, so it is possible to check in detail whether the clutch is in a slip state (S10-3).

Accordingly, as a result of the third checking process (S10-3), when the clutch is not in a slip state, the engagement state of the clutch can be sensed as being an open state, and when the engagement state of the clutch is in a slip state, the clutch can be sensed as a slip state. That is, since a clutch may be actually in an open state even in a creeping, starting, shifting, or engaging state in which a clutch is determined as being in a slip state, it is possible to filter-control an engine torque by more accurately examine the state of a clutch through the third checking process (S10-3). The details will be provided below.

Further, as a result of the second checking process (S10-2), when the clutch is not in a creeping, starting, shifting, or engaging state, the engagement state of the clutch can be sensed as being a locking state. That is, when the clutch is determined as not being in an open or slip state, it is possible to determine that the clutch is fully locked.

In the calculating of a slip index (S20), the slip index is obtained by subtracting a value obtained by multiplying clutch torque by clutch RPM from a value obtained by multiplying engine torque by engine RPM, and then by dividing the difference by a value obtained by multiplying engine torque by engine RPM.

That is, the slip index shows the degree of power from an engine that is transmitted to a driveshaft through a clutch, so it is possible to check the degree of power transmission from differences between engine torque and RPM and clutch torque and RPM. Accordingly, as the slip index goes to zero, engine power is smoothly transmitted to driving wheels through a clutch, in which it is possible to determine that the clutch is almost in a locking state.

In contrast, as the slip index goes to 1, engine power is less transmitted to driving wheels through a clutch, in which it is possible to determine that the clutch is almost in an open state.

According to the present disclosure, in the filter-controlling (S30), when the engagement state of the clutch is the locking state rather than the slip state, and when it is an open state rather than the locking state, the engine torque can be filter-controlled such that the slope increases. That is, when the engagement state of the clutch is an open state, engine power is not transmitted to the driving system, so shock is not transmitted by a change in engine torque. Accordingly, when the ECU 5 receives a signal showing that the engagement state of the clutch is an open state from the TCU 7, it controls the engine torque at a large slope, so the engine torque increases larger than the clutch torque, thereby preventing engine flare.

On the other hand, when the engagement state of the clutch is a slip state, engine power is transmitted to the driving system, and when the engine torque rapidly changes, shock is applied to the driving system. Accordingly, when the ECU 5 receives a signal from the TCU 7 showing that the clutch is in a slip state, it controls the engine torque at a low slope, thereby preventing shock to the driving system. Further, when the ECU 5 senses that the clutch is in a locking state, it controls the engine torque at a slope smaller than when the clutch is in an open state and at a slope larger than when the clutch is in a slip state.

In the filter-controlling (S30), when the engagement state of the clutch is an open state, as the difference between the slip index and an expected slip index in the open state of the clutch increases, the slope of the engine torque is controlled to be decreased. On the contrary, in the filter-controlling (S30), when the engagement state of the clutch is a locking state, as the difference between the slip index and an expected slip index in the locking state of the clutch increases, the slope of the engine torque is controlled to be decreased.

That TCU 7 calculates a slip index of the clutch and transmits a corresponding signal to the ECU 5, in addition to sensing the engagement state of the clutch. Accordingly, the ECU 5 can perform more accurate filter-control on the engine torque by filter-controlling engine torque, generally using the engagement state of the clutch and the change of the slip index.

In detail, when the engagement state of the clutch is an open state, the expected slip index is set to 1, but the clutch may finely slip. In this case, the slip index is calculated as a value smaller than 1 and shock may be applied to the driving system due to a rapid change of the engine torque. Accordingly, the ECU 5 can perform filter-control such that the slope of the engine torque decreases.

When the engagement state of the clutch is the locking state, the expected slip index is set to zero, but when the clutch finely slips, a slip index larger than zero may be calculated. In this case, the ECU 5 can perform filter-control such that the slope of the engine torque decreases.

Figure 5:
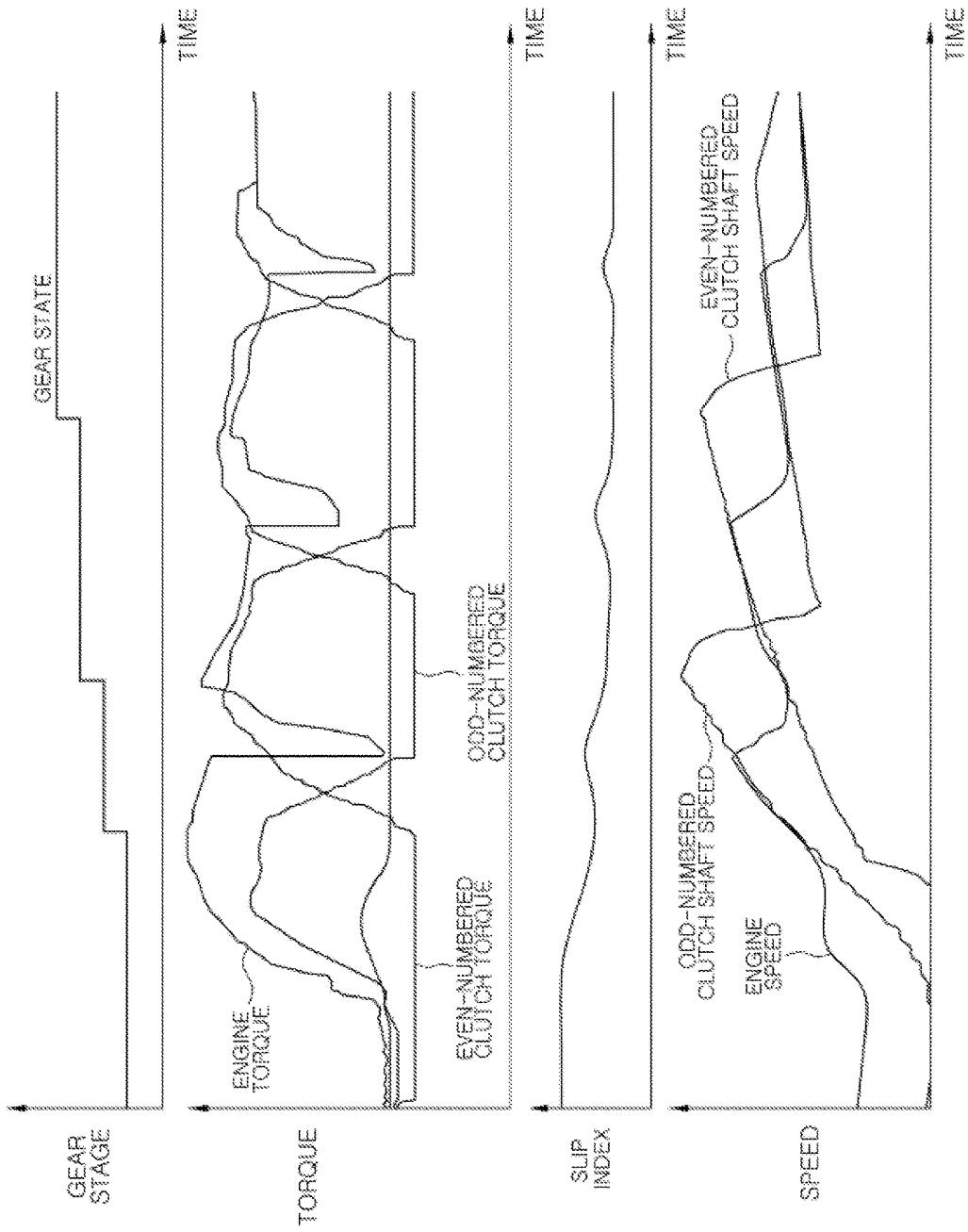
FIG. 5 is a graph showing an engine torque change during acceleration according to embodiments of the present disclosure.

FIG. 5 is a graph showing an engine torque change during acceleration according to embodiments of the present disclosure. As shown in FIG. 5, a change in engine torque according to a slip index can be seen. In particular, when a disengagement clutch is opened during shifting, the engine torque rapidly decreases, so an engine flare can be prevented by the difference between the engine torque and the clutch torque.

In the third checking process (S10-3), when the clutch is in a creeping state and the rotational speed of an input shaft is a first speed or more, the ECU 5 can determine that the clutch is not in a slip state.

Figure 6:
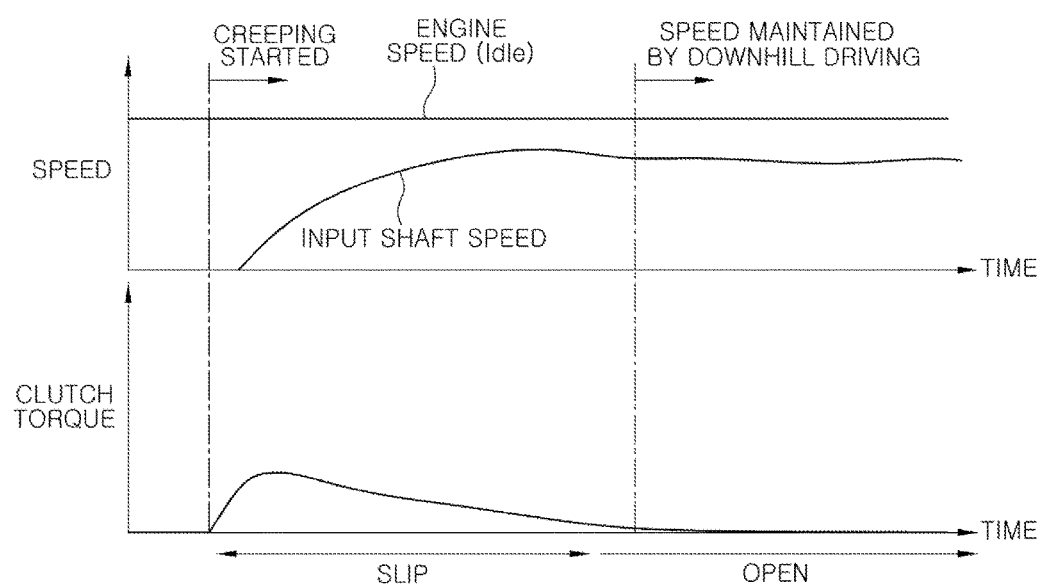
FIG. 6 is a graph showing a clutch torque change in a creeping state.

FIG. 6 is a graph showing a clutch torque change in a creeping state. As shown in FIG. 6, when a vehicle creeps, a clutch is controlled into a slip state to prevent the engine RPM from dropping to idle RPM or less. However, when a vehicle is driven on a downhill, the speed of the input speed gradually increases, so the engine can be driven at the idle RPM even without slipping of the clutch.

Accordingly, when the rotational speed of the input shaft is maintained at a speed that is greater than or equal to a first speed, the clutch is opened, so the ECU 5 can determine that the clutch is in an open state when the rotational speed of the input shaft is greater than or equal to the first speed.

Further, in the third checking process (S10-3), the ECU 5 can determine that the clutch is not in a slip state when the clutch is in a starting state and the engine speed increases to a speed smaller than a second speed.

Figure 7:
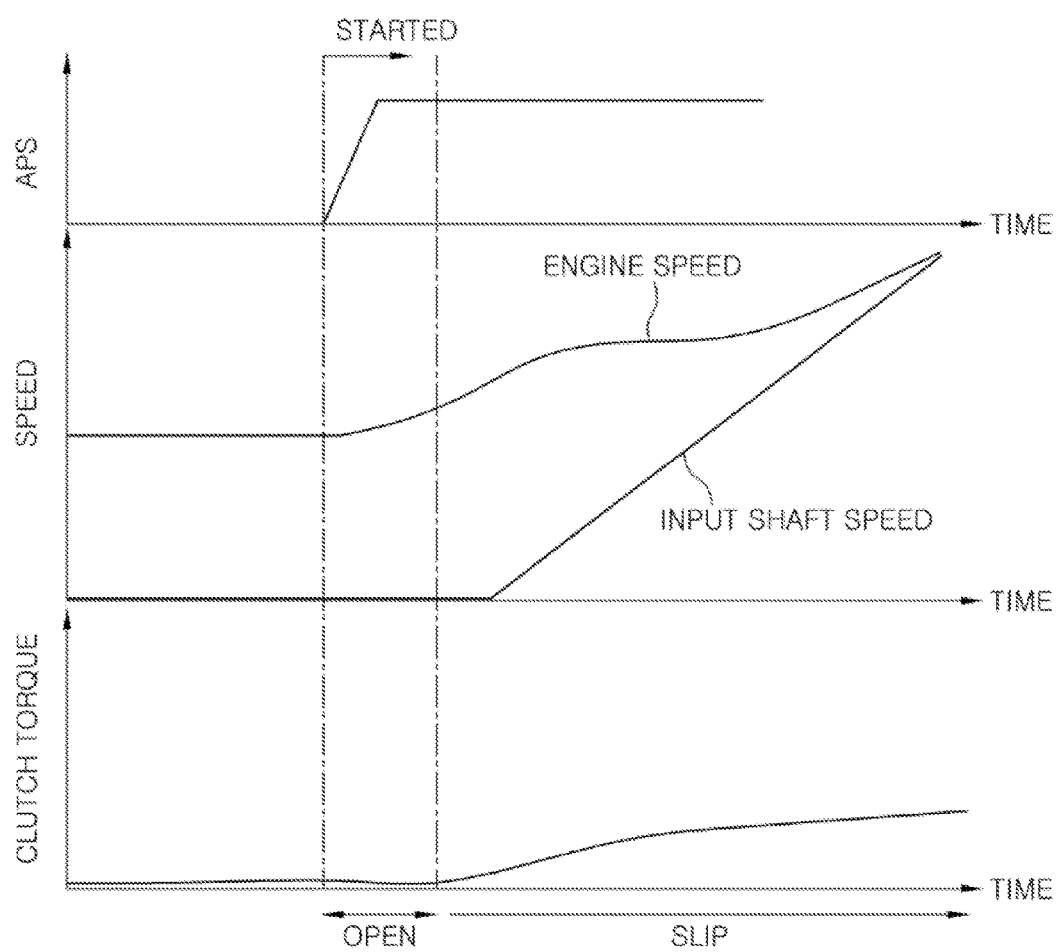
FIG. 7 is a graph showing a clutch torque change in a starting state.

FIG. 7 is a graph showing a clutch torque change in a starting state. As shown in FIG. 7, the TCU 7 increases clutch torque after ascertaining that an engine speed follows a desired engine speed, if a vehicle has been started. That is, even if a vehicle has been started, the clutch does not immediately slip, but slips after a predetermined time.

Accordingly, when the clutch is in a starting state and the engine speed increases to a speed smaller than a second speed, the ECU 5 can determine that the clutch is in an open state without clutch torque increased.

Further, in the third checking process (S10-3), when the clutch is in a shifting state and a disengagement clutch is disengaged before the torque of the disengagement clutch is increased to engage an engagement clutch, the ECU 5 can determine that the clutch is not in a slip state.

Figure 8:
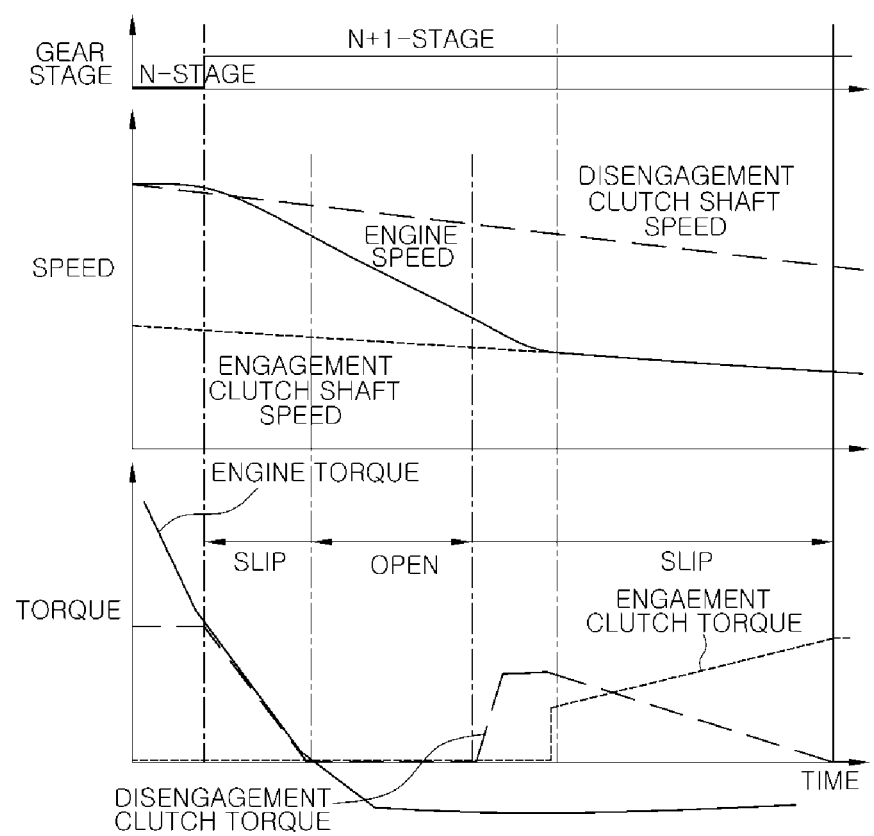
FIG. 8 is a graph showing a clutch torque change in a shifting state.

FIG. 8 is a graph showing a clutch torque change in a shifting state. As shown in FIG. 8, when a clutch is in a shifting state, slip of the disengagement clutch is gradually removed and the disengagement clutch is opened. Thereafter, the disengagement clutch appropriately slips before the engagement clutch slips for engaging, so the engine speed and the shaft speed of the engagement clutch are synchronized.

Accordingly, when the clutch is in a shifting state, the ECU 5 can determine that the clutch is in an open state while the disengagement clutch is disengaged and slips again.

Further, in the third checking process (S10-3), the ECU 5 can determine that the clutch is not in a slip state when the clutch is in an engaging state and the engine speed is less than the speed of the input shaft.

Figure 9:
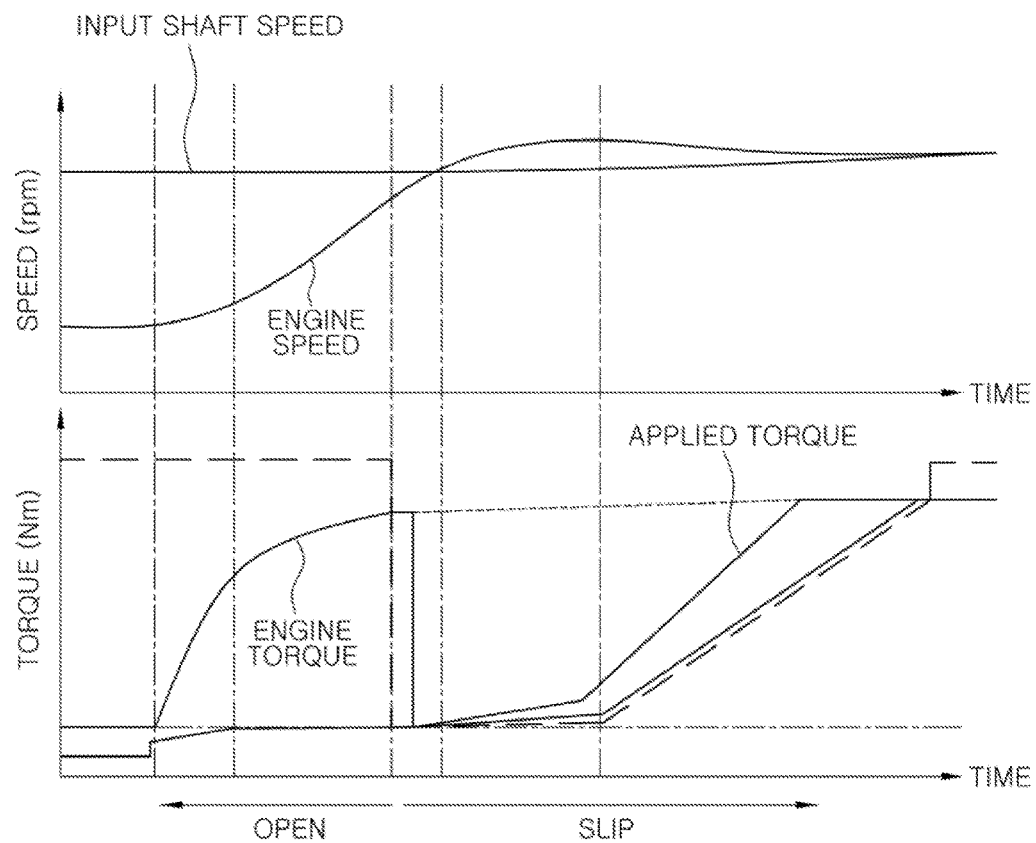
FIG. 9 is a graph showing a clutch torque change in an engaging state.

FIG. 9 is a graph showing a clutch torque change in an engaging state. As shown in FIG. 9, when a clutch is in an engaging state, that is, when the engine speed is lower than the speed of the input shaft, the applied torque does not increase over zero, so the clutch is maintained in the open state.

Accordingly, when the clutch is in an engaging state and the engine speed is lower than the speed of the input shaft, the ECU 5 can determine that the clutch is in an open state.

As described above, even if the TCU 7 determines that the engagement state of a clutch is a slip state, it is possible to actually discriminate the open state of the clutch, so filter-control of engine torque can be more precisely performed.

According to the engine torque control method for a vehicle described above, filter-control of engine torque is performed on the basis of clear information about engagement torque of a clutch, so engine flare can be prevented.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. An engine torque control method for a vehicle, comprising:
    sensing an engagement state of a clutch of the vehicle;
    calculating a slip index according to engine torque, engine revolutions per minute (RPM), clutch torque, and clutch RPM; and
    filter-controlling the engine torque based on the calculated slip index and the sensed engagement state of the clutch.

2. The method of claim 1, wherein the sensing of the engagement state comprises:
    a first checking process that checks whether the clutch is in an open state;
    a second checking process that checks whether the clutch is in a creeping, starting, shifting, or engaging state, when the clutch is determined as being in the open state; and
    a third checking process that checks whether the clutch is in a slip state, when the clutch is determined as being in any of the creeping, starting, shifting, or engaging state.

3. The method of claim 2, wherein when the clutch is determined as being in the open state, the engagement state of the clutch is sensed as being an open state.

4. The method of claim 2, wherein when the clutch is not in the slip state, the engagement state of the clutch is sensed as being an open state.

5. The method of claim 2, wherein when the clutch is not in any of the creeping, starting, shifting, or engaging state, the engagement state of the clutch is sensed as being a locking state.

6. The method of claim 1, wherein the calculating of the slip index comprises:
    obtaining the slip index by subtracting a value obtained by multiplying the clutch torque by the clutch RPM from a value obtained by multiplying the engine torque by the engine RPM, and then by dividing a difference of the values by a value obtained by multiplying the engine torque by the engine RPM.

7. The method of claim 1, wherein when the engagement state of the clutch is a locking state or an open state, the engine torque is filter-controlled such that a slope of the engine torque increases.

8. The method of claim 1, wherein when the engagement state of the clutch is the open state, as a difference between the slip index and an expected slip index in the open state of the clutch increases, a slope of the engine torque is controlled to decrease.

9. The method of claim 1, wherein when the engagement state of the clutch is a locking state, as a difference between the slip index and an expected slip index in the locking state of the clutch increases, a slope of the engine torque is controlled to decrease.

10. The method of claim 2, wherein when the clutch is in the creeping state and a rotational speed of an input shaft is equal to or greater than a first speed, it is determined that the clutch is not in the slip state.

11. The method of claim 10, wherein when the clutch is in the starting state and an engine speed increases to a speed less than a second speed, it is determined that the clutch is not in the slip state.

12. The method of claim 2, wherein when the clutch is in the shifting state and a disengagement clutch is disengaged before torque of the disengagement clutch is increased to engage an engagement clutch, it is determined that the clutch is not in the slip state.

13. The method of claim 2, wherein when the clutch is in the engaging state and an engine speed is less than a speed of an input shaft, it is determined that the clutch is not in the slip state.

* * * * *